Nov. 13, 1962  I. W. TALBOTT ET AL  3,063,700
BUMPER FOR LOADING DOCKS AND THE LIKE
Filed March 12, 1958
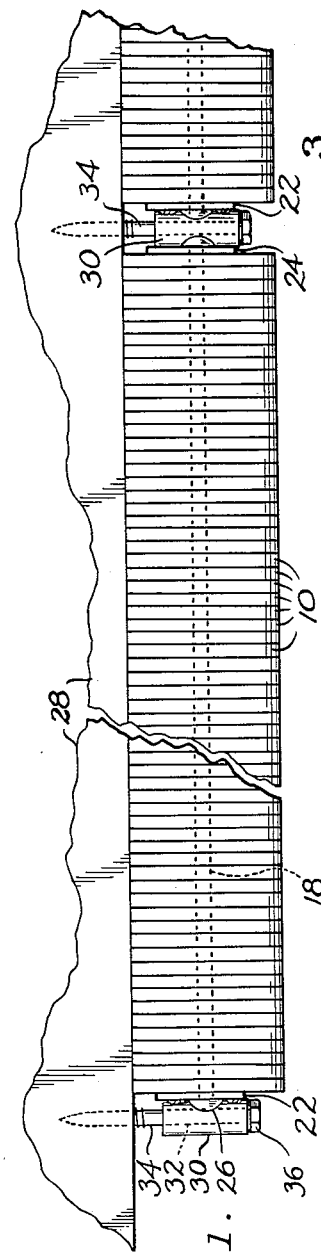
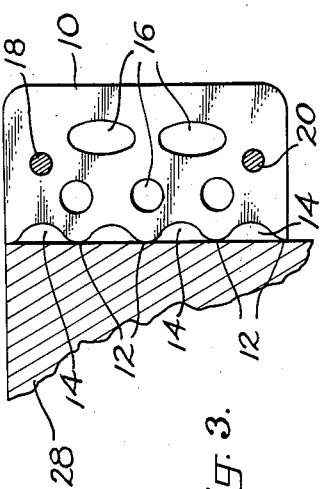
Irl W. Talbott
Adolph R. Hendry
INVENTORS
BY
Agent

United States Patent Office 3,063,700
Patented Nov. 13, 1962

3,063,700
BUMPER FOR LOADING DOCKS AND THE LIKE
Irl W. Talbott, 6145 SE. Malden St., and Adolph R. Hendry, 3326 SE. 7th St., both of Portland, Oreg.
Filed Mar. 12, 1958, Ser. No. 720,851
4 Claims. (Cl. 267—1)

This invention pertains to bumpers for loading docks and the like, and relates particularly to a novel assembly which provides a resilient bumper of improved quality and versatility of use.

Resilient bumpers are employed for many purposes, such as to line the projecting ends of loading docks for abutment by trucks, to line the sides of boats for protection against damage upon contact with docks or other boats, and for many other purposes.

It is a principal object of this invention to provide a resilient bumper which is characterized by having substantially uniform resilience over its entire area.

Another important object of this invention is the provision of a resilient bumper which may be assembled to any desired length and shape to accommodate various types of installations.

Still another important object of the present invention is to provide a resilient bumper unit a plurality of which may be assembled end to end in efficient manner to provide a bumper of desired length.

A further important object of this invention is to provide a resilient bumper which is of simplified construction for economical manufacture, which may be installed with a minimum of time and effort, and which is extremely rugged for heavy duty use.

The foregoing and other objects and advantages of this invention will appear from the following detailed description, taken in connection with the accompanying drawings, in which:

FIG. 1 is a fragmentary foreshortened plan view of a truck loading dock showing mounted thereon a resilient bumper embodying the features of the present invention;

FIG. 2 is a fragmentary foreshortened view in front elevation of the dock and bumper assembly of FIG. 1; and FIG. 3 is a fragmentary sectional view taken along the line 3—3 in FIG. 2 and showing details of construction of the resilient bumper.

The bumper of the present invention includes an elongated block of resilient material, preferably formed as a lamination of a plurality of resilient or semi-resilient plates 10, arranged in face-abutting relationship in any desired number to provide a stack of desired length. The material may be rubber, semi-resilient synthetic thermoplastic material, cork, felt, or other suitable material. In the preferred embodiment of this invention, the plates are constructed from used tire casings, suitably the tread portions thereof. The primary advantages of this source of material are its low cost as waste material and its inherent strength and semi-resilience, provided by the reinforcement of rubber with fabric.

Referring to FIG. 3 of the drawing, the plates forming the lamination preferably are contoured to identical shapes. The inner face of the resilient block, or, in the embodiment illustrated, the inner edge of each plate, preferably is notched or scalloped in the manner illustrated, to provide a plurality of spaced abutment areas 12 and interposed voids 14. When the plates are made of such semi-resilient materials as the tire casings previously mentioned, it may be desired to enhance the resilience by providing transverse perforations through the plates, such as those illustrated at 16.

The assembly of stacked plates is held together as a unit by means of the elongated rods 18, 20 which extend through aligned transverse perforations in the plates and similar registering openings in the metal end plates 22, 24. The assembly of plates preferably is held within a vise and drawn together into a compact unit before the longitudinal rods are secured. The ends of the rods may be riveted over, as illustrated at 26, or they may be provided with threaded end sections for the engagement of securing nuts.

In order that a bumper unit may be secured firmly to a dock 28 or other structure and yet provide substantially uniform resilience throughout its length, means is provided at the opposite ends of the unit for sliding engagement with anchoring bolts. Thus, in the embodiment illustrated, a sleeve 30 in the form of a length of metal pipe or tubing is welded or otherwise secured to each end plate 22 and 24, the bore 32 thereof extending substantially normal to the plane of the rear scalloped side of the plate assembly. Each of these bores is adapted to receive and guide an anchoring bolt 34 slidably therethrough, the latter being anchored in the loading dock 28 or other supporting structure, with the head end 36 of the bolt engaging the outer end of the sleeve.

As best illustrated in FIG. 2 of the drawing, the sleeves 30 mounted at opposite ends of a unit preferably are secured to the end plates 22, 24 at laterally offset positions, preferably on opposite sides of the longitudinal center line of the unit. It is by this arrangement that a plurality of units may be stacked end to end, with the sleeves and anchoring bolts of adjacent units overlapping to minimize the space between units.

From the foregoing explanation it will be apparent that the resilient bumper provides a uniform resilience over its entire length. Thus, if a truck moves into abutment with the end portion of a bumper unit, the resilient plates 10 are caused to move toward the supporting dock structure by virtue of the collapsing of the scalloped inner edge. Moreover, such inward movement of the resilient plates is facilitated by the sliding arrangement of the sleeve 30 on the mounting bolt 34, which permits the sleeve and attached end plate and rods 18, 20 to move simultaneously with the collapse of the resilient plates. Thus, the same degree of resilience is provided at the ends of a bumper unit as is provided throughout its entire length.

Accordingly, the present invention provides a resilient bumper which is of rugged construction to accommodate heavy duty use, and yet permits a uniform degree of resilience throughout its length. The bumper unit is assembled with minimum time and may be constructed most economically with the use of such waste material as old tire casings. Installation of the unit also involves a minimum of time and expense, requiring merely the anchoring of a single bolt at each end of a unit. The offset arrangement of the mounting sleeves at the opposite ends of a unit accomodates overlapping of adjacent units with a minimum of exposed space therebetween, to provide a bumper assembly of any desired length.

It will be apparent to those skilled in the art that various changes may be made in the specific details of construction described hereinbefore. For example, the elongated block together with the openings 16 and irregular inner face, may be formed by the extrusion of suitable material. If the laminated construction is used, the plates may be stamped from tire casings or other material, or they may be formed by conventional molding techniques. Various forms of sliding interconnections between the bumper unit and a dock or other structure may be substituted for the sleeve arrangement illustrated. For example, one or both of the bolt heads 26 at each end of the unit may be replaced by an eye loop formed as an extension of the rods 18, 20 to receive the anchor bolts 34 slidably therethrough, in the manner of sleeve 30. These and other changes may be made, as desired, without departing from the spirit of this invention and the scope of the appended claims.

Having now described our invention and the manner in which the same may be used, what we claim as new and desire to secure by Letters Patent is:

1. A bumper assembly comprising an elongated block of resilient material having an inner abutment face for engaging a support, longitudinally spaced anchor engaging guide means on the elongated block and arranged with their anchor engaging axes substantially normal to said inner abutment face, each guide means terminating at its inner end outward from said inner abutment face, and elongated structurally rigid anchor means adapted for attachment to a support and extending substantially normal to said inner abutment face, the anchor means slidably engaging and supporting the guide means for movement of the latter along the anchor means toward and away from the support during compression and recovery of the resilient block.

2. The bumper assembly of claim 1 wherein the elongated block comprises a plurality of resilient plates arranged in face-abutting relationship forming a stack, a structural end plate at each end of the stack, and elongated rod means extending through said stack and end plates and securing the same together as a unit, the inner edge of each end plate terminating outward from the inner support-engaging edges of the resilient plates, at least one anchor engaging guide means being secured to each of said end plates.

3. The bumper assembly of claim 1 wherein the longitudinally spaced anchor engaging guide means are positioned relative to each other at different distances from the longitudinal edges of said inner abutment face to accommodate overlapping of the anchor engaging guide means on adjacent units.

4. The bumper assembly of claim 1 wherein the anchor engaging guide means comprises an elongated hollow sleeve mounted on each end of the block with the bore axis of each sleeve extending substantially normal to the plane of the inner face of the block, each sleeve terminating at its inner end outward from said inner abutment face, and the anchor means comprises an elongated bolt receivable slidably in the bore of each sleeve.

References Cited in the file of this patent

UNITED STATES PATENTS

| Re. 24,276 | Schuyler | Feb. 12, 1957 |
| 1,117,579 | Kause | Nov. 17, 1914 |
| 1,981,182 | Lyons | Nov. 20, 1934 |
| 2,165,383 | Johnson et al. | July 11, 1939 |